(12) United States Patent
Campbell

(10) Patent No.: US 8,590,836 B2
(45) Date of Patent: *Nov. 26, 2013

(54) BREATHER APPARATUS ON ELECTROMECHANICAL ACTUATORS FOR AIRCRAFT LANDING GEAR SYSTEMS

(71) Applicant: GE Aviation Systems, LLC, Grand Rapids, MI (US)

(72) Inventor: Douglas Jerome Campbell, Martinsville, NJ (US)

(73) Assignee: Whippany Actuation Systems, LLC, Hanover, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,225

(22) Filed: Dec. 4, 2012

(65) Prior Publication Data

US 2013/0118613 A1  May 16, 2013

Related U.S. Application Data

(63) Continuation of application No. 12/240,536, filed on Sep. 29, 2008, now Pat. No. 8,328,135.

(51) Int. Cl.
*B64C 25/10* (2006.01)

(52) U.S. Cl.
USPC .................................. 244/102 A; 244/102 R

(58) Field of Classification Search
USPC .............. 29/428; 74/606 R, 17.8; 244/102 A, 244/102 R, 100 R
See application file for complete search history.

(56) References Cited

U.S. PATENT DOCUMENTS

| 22,890 | A | 2/1859 | Manney |
| 1,939,845 | A | 12/1933 | Farmer |
| 2,202,207 | A | 5/1940 | Johnson |
| 2,830,671 | A | 4/1958 | Robbins |
| 2,837,926 | A | 6/1958 | Korsgren, Sr. et al. |
| 4,557,177 | A | 12/1985 | Cheney |
| 5,349,894 | A | 9/1994 | Greer |
| 6,058,969 | A | 5/2000 | Bollwahn et al. |
| 6,395,073 | B1 | 5/2002 | Dauber |
| 6,515,827 | B1 | 2/2003 | Raymond et al. |
| 6,557,240 | B1 | 5/2003 | Voights |
| 7,098,619 | B2 | 8/2006 | Stridsberg |
| 7,525,404 | B2 | 4/2009 | Larimore et al. |
| 2008/0141803 | A1 | 6/2008 | Christensen et al. |

*Primary Examiner* — Christopher P Ellis
(74) *Attorney, Agent, or Firm* — Baker & Hostetler LLP

(57) ABSTRACT

An actuator system and a method for assembling the same are provided. An actuator system includes a housing and a cap. The housing includes a cavity defined by the housing and an opening defined in a wall of the housing. The housing encases an actuator within the cavity. The cap is coupled to the housing to facilitate shielding the opening from a surrounding environment.

18 Claims, 4 Drawing Sheets

BREATHER APPARATUS ON ELECTROMECHANICAL ACTUATORS FOR AIRCRAFT LANDING GEAR SYSTEMS

CROSS-REFERENCE TO RELATED APPLICATIONS

This application is a continuation and claims priority to U.S. patent application Ser. No. 12/240,536 filed Sep. 29, 2008 for "BREATHER APPARATUS ON ELECTROMECHANICAL ACTUATORS FOR AIRCRAFT LANDING GEAR SYSTEMS," which is hereby incorporated by reference herein in its entirety.

BACKGROUND OF THE INVENTION

The embodiments described herein relate generally to aircraft landing gear systems and, more particularly, to electromechanical actuator systems used within aircraft landing gear systems.

At least some known electromechanical actuator systems include a housing that experiences varying pressures and temperatures during a typical flight cycle of an aircraft. For example, during the aircraft ascent, the internal pressure and temperature within the housing decreases as the external pressure and temperature of the surrounding environment decrease until the aircraft is at cruising altitude. Conversely, during the aircraft descent, the internal pressure and temperature within the housing generally increases as the external pressure and temperature of the surrounding environment increases.

At least some known electromechanical actuator systems balance the internal pressure and temperature within the housing with the external pressure and temperature of the surrounding environment by including an opening in the housing that facilitates venting of air into, and out of, the housing. For example, during aircraft ascent, the opening discharges air from the housing through the opening as the external pressure and temperature of the surrounding environment decreases. At cruising altitudes, the internal pressure and temperature within the housing are typically low enough that any liquid water within the housing may become frozen. During aircraft descent, air enters the housing through the opening as the external pressure and temperature of the surrounding environment increases. More specifically, when the landing gear bay doors open during landing, the warm, moist air may condense on an actuator mechanism encased within the housing when the actuator mechanism is still cold from the flight. Some condensation may be drawn into the actuator mechanism, and over time, such condensation may cause corrosion, hydrolysis, short circuits, and/or increase an overall mass of the actuator mechanism to the point wherein the actuator mechanism is inoperable.

To address the condensation problem, at least some known electromechanical actuator systems hermetically seal the actuator mechanism within the housing and use desiccants to facilitate reducing an amount of condensation that can accumulate over an extended period of time. However, sealing the actuator mechanisms within the housing causes a substantial pressure difference to be created between the internal pressure within the housing and the external pressure of the surrounding environment. The increased pressure difference may induce additional strain on the seals of the housing, which may cause premature failure of the seals over time.

BRIEF SUMMARY OF THE INVENTION

In one embodiment, a method for assembling an actuator system is provided. The method includes positioning a housing to encase an actuator within a cavity defined by the housing, and coupling a cap to the housing to facilitate shielding an opening defined in a wall of the housing from a surrounding environment.

In another embodiment, an actuator system is provided. The actuator system includes a housing and a cap. The housing includes a cavity defined by the housing and an opening defined in a wall of the housing. The housing encases an actuator within the cavity. The cap is coupled to the housing to facilitate shielding the opening from a surrounding environment.

DETAILED DESCRIPTION OF THE INVENTION

An electromechanical actuator system (EMA) includes a housing that maintains its aridity during a course of repeated flight cycles while reducing pressure differences that may be created between an internal pressure within the housing and an external pressure of the surrounding environment is desired. As described herein, maintaining the aridity of the housing facilitates increasing reliability of the actuator mechanism (actuator) encased within the housing, and reducing pressure differences facilitates reducing sealing requirements of the housing and increasing a useful seal life.

Figure 1:
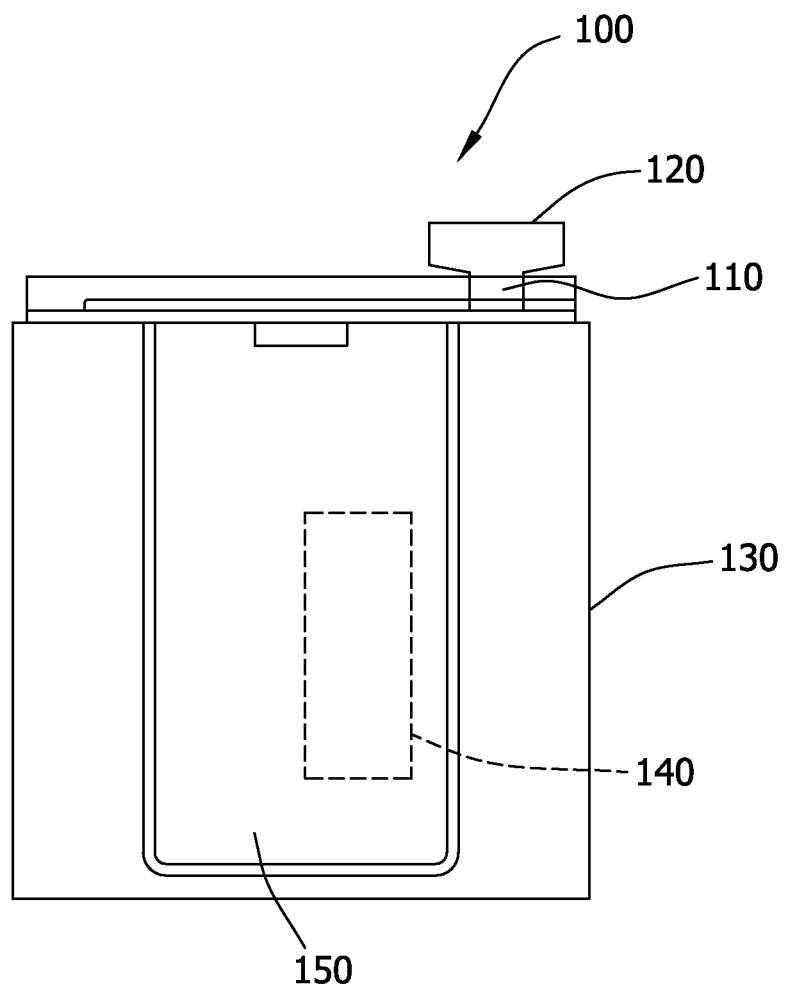
FIG. 1 is a cross-sectional schematic illustration of an exemplary electromechanical actuator system that may be used on an aircraft.

FIG. 1 is a cross-sectional schematic illustration of an exemplary electromechanical actuator system, or EMA, 100 that may be used in an aircraft (not shown). In the exemplary embodiment, EMA 100 includes a moisture pump 110, a protective cap 120, a housing 130, an actuator 140, and a cavity 150. Housing 130 includes a moisture pump 110, which is an opening oriented from an internal surface to an external surface of housing 130. Protective cap 120 is coupled to housing 130 such that it substantially covers moisture pump 110. Actuator 140 is positioned within cavity 150 defined by the internal surface of housing 130.

During a typical flight cycle of the aircraft, housing 130 experiences varying internal pressures and temperatures. For example, during the aircraft ascent, the internal pressure and temperature within housing 130 decreases as the external pressure and temperature of the surrounding environment decrease until the aircraft is at cruising altitude. Conversely, during the aircraft descent, the internal pressure and temperature within housing 130 generally increases as the external pressure and temperature of the surrounding environment increases.

To balance the internal pressure and temperature within housing 130 with the external pressure and temperature of the surrounding environment, moisture pump 110 facilitates venting of air into, and out of, housing 130. For example, during aircraft ascent, moisture pump 110 discharges air from housing 130 through moisture pump 110 as the external pressure and temperature of the surrounding environment decreases. During aircraft descent, air enters housing 130 through moisture pump 110 as the external pressure and temperature of the surrounding environment increases.

To protect actuator 140 from water, moisture, and/or condensation, protective cap 120 provides interfacial sealing that inhibits water from entering housing 130 through moisture pump 110. More specifically, protective cap 120 facilitates protecting moisture pump 110 and actuator 140 from incidental water ingress, water spray, surface water, and clogging. Moreover, protective cap 120 prevents housing 130 from ingesting more liquid through moisture pump 110 than can be expelled from housing 130 through moisture pump 110. In an alternative embodiment, protective cap 120 encases housing 130. In such an embodiment, protective cap 120 provides moisture ingress protection due to its relative geometry and orientation to moisture pump 110.

Figure 2:
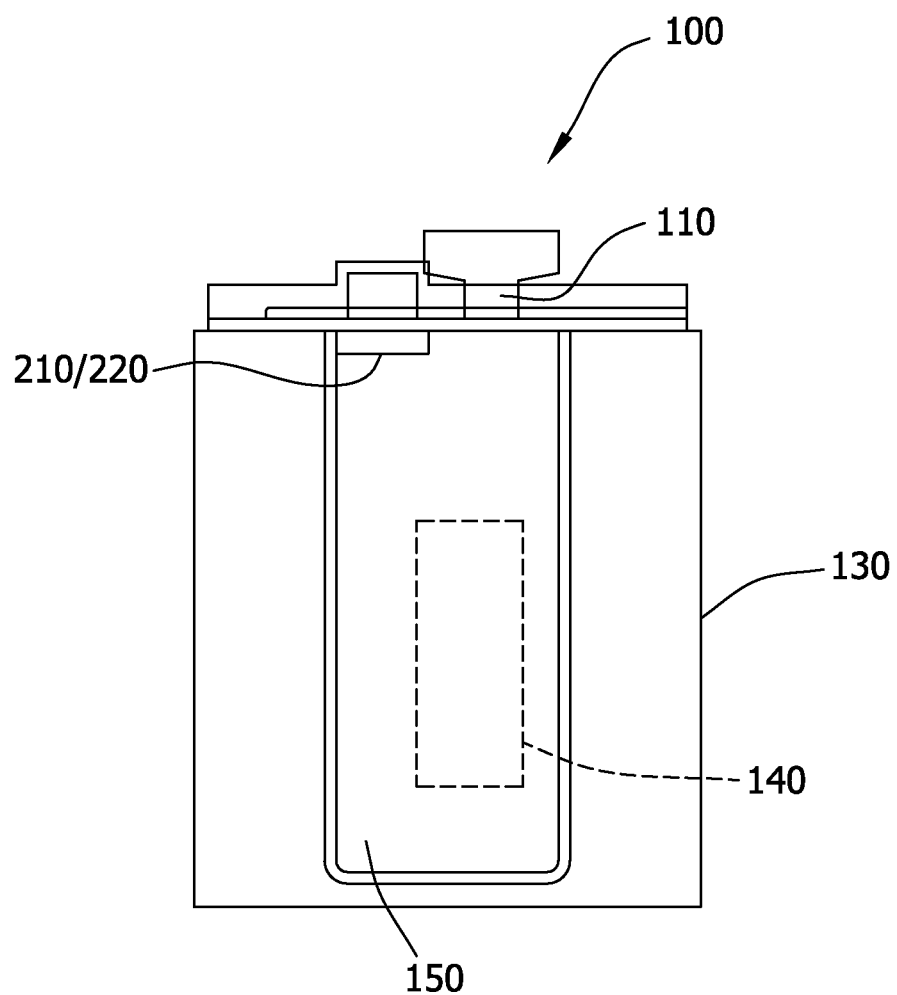
FIG. 2 is a cross-sectional schematic illustration of the electromechanical actuator system shown in FIG. 1.

FIG. 2 is a cross-sectional schematic illustration of EMA 100. In the exemplary embodiment, housing 130 includes a moisture trap 210 and/or a desiccant cartridge 220. Moisture trap 210 is a cavity that is defined between moisture pump 110 and cavity 150. Desiccant cartridge 220 is a material positioned between moisture pump 110 and cavity 150.

In the exemplary embodiment, moisture trap 210 is sized and oriented to trap incidental liquid water ingress in a location remote from actuator 140. More specifically, water seeping through moisture pump 110 is retained in moisture trap 210 and is prevented from contacting actuator 140. Ultimately, any water residing in moisture trap 210 is expelled from housing 130 as air is channeled into and from housing 130 through moisture pump 110.

In the exemplary embodiment, desiccant cartridge 220 is fabricated from a material that enables it to absorb incidental liquid water ingress. More specifically, water seeping through moisture pump 110 is absorbed by desiccant cartridge 220 and is prevented from contacting actuator 140.

Figure 3:
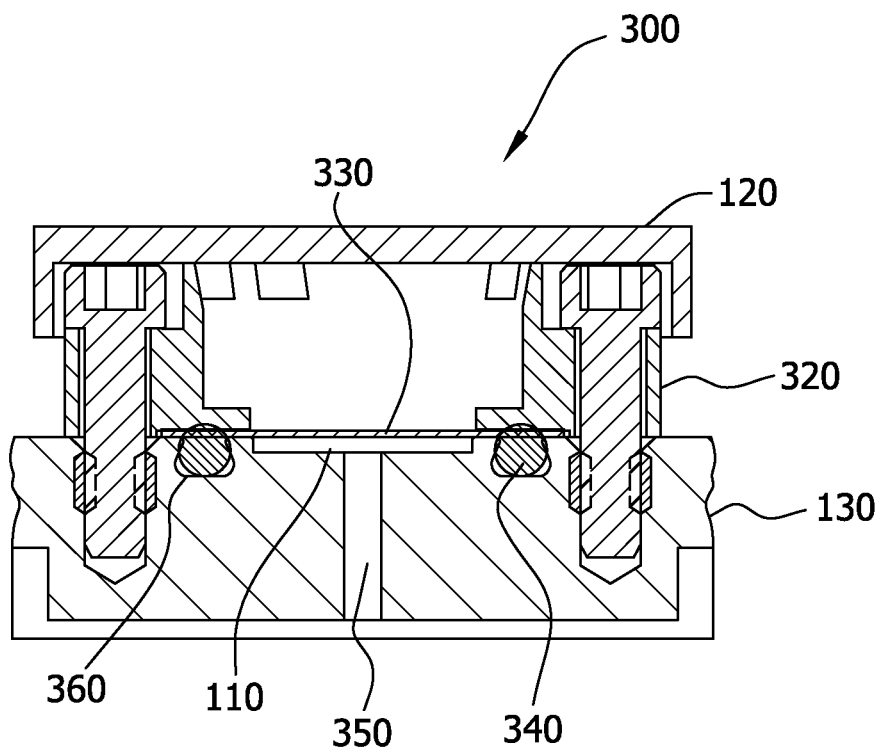
FIG. 3 is a schematic illustration of an exemplary protective cap assembly used with the electromechanical actuator system shown in FIG. 1.
Figure 4:
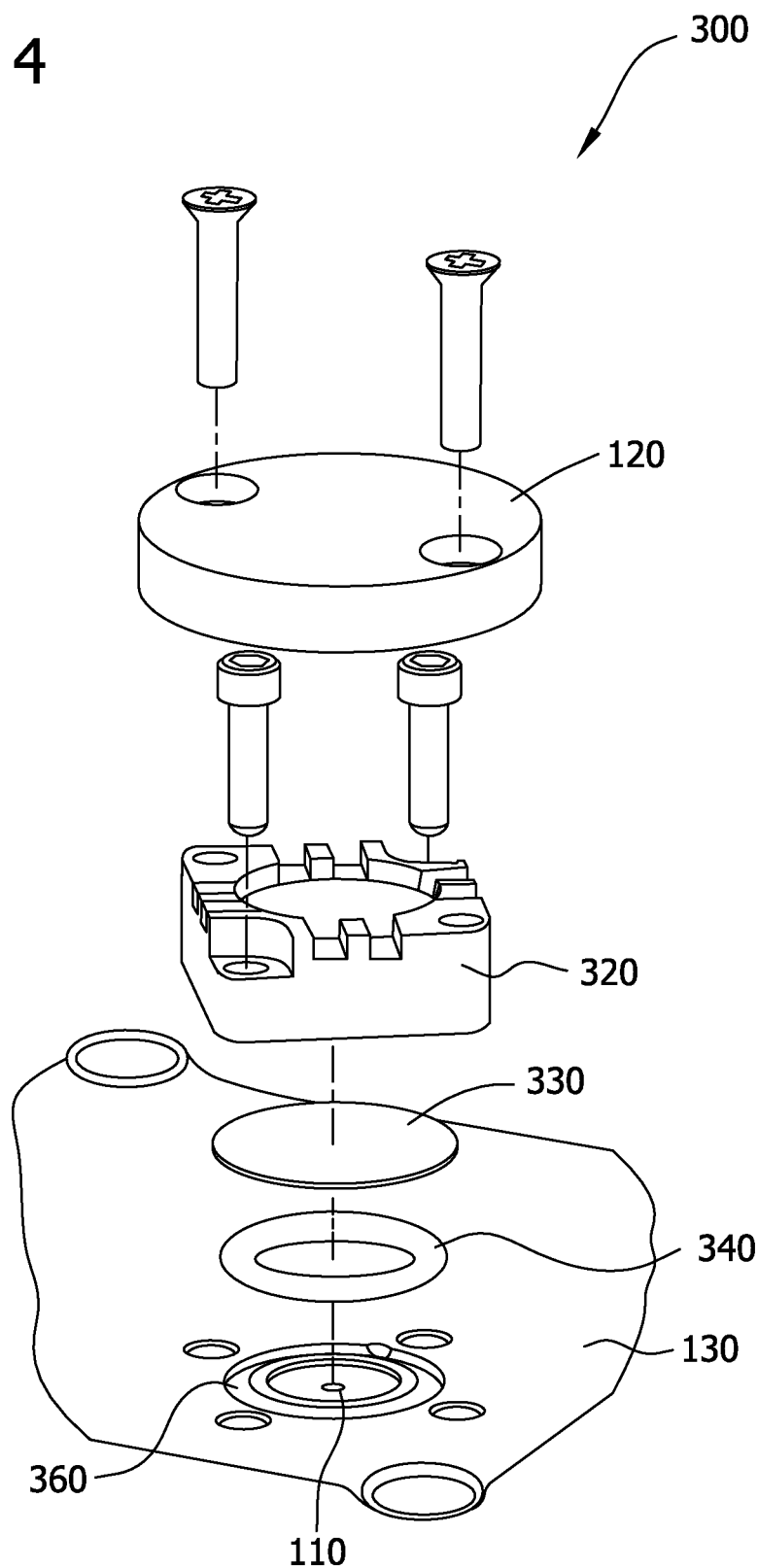
FIG. 4 is a schematic illustration of the protective cap assembly shown in FIG. 3.

FIGS. 3 and 4 are schematic illustrations of an exemplary protective cap assembly 300 that may be used with EMA 100 (shown in FIGS. 1 and 2). In the exemplary embodiment, protective cap assembly 300 includes protective cap 120, a base 320, a porous membrane 330, an elastomer ring 340, and a diffusion inhibition tube 350. Elastomer ring 340 is also known as O-ring and is substantially circular. In alternative embodiments, each feature 120, 320, 330, 340, 350 can operate independently, or in any combination, of the other features.

In the exemplary embodiment, protective cap assembly 300 is coupled to housing 130 such that it substantially covers moisture pump 110. More specifically, housing 130 is coupled to base 320, such that porous membrane 330 is retained against housing 130. Moreover, housing 130 includes a groove 360 that is sized and oriented to position O-ring 340 between housing 130 and base 320. More specifically, O-ring 340 is sized and shaped to fit securely in a mating relationship within groove 360 formed under base 320.

In the exemplary embodiment, porous membrane 330 inhibits water from entering housing 130 through moisture pump 110 while still enabling water to leave housing 130 through moisture pump 110 because of its composition. Porous membrane 330 can be fabricated from any material composition that facilitates this function. Some examples of porous membrane 330 include, but are not limited to, a fabric water barrier such as Teflon (Teflon is a registered trademark of the DuPont Company for products made from fluoropolymers), a sintered metal water barrier, and a sintered ceramic water barrier.

In the exemplary embodiment, O-ring 340 is fabricated from an elastomer and has a substantially circular cross-section shape. Moreover, O-ring 340 facilitates sealing between housing 130 and base 320.

In the exemplary embodiment, diffusion inhibition tube 350 is a narrow tube that connects moisture pump 110 to cavity 150 (not shown in FIGS. 3 and 4). Diffusion inhibition tube 350 slows water vapor ingress during steady state ground conditions. More specifically, diffusion inhibition tube 350 has a length that is sized relative to its diameter such that a length-to-diameter ratio of diffusion inhibition tube 350 facilitates reducing a rate of air exchange between the cavity of housing 130 and the surrounding environment. Thus, diffusion inhibition tube 350 facilitates reducing a rate of humidity exchange within housing 130.

Exemplary embodiments of a breather apparatus on electromechanical actuators for aircraft landing gear systems are described above in detail. The methods and systems are not limited to the specific embodiments described herein, but rather, components of systems and/or steps of the methods may be utilized independently and separately from other components and/or steps described herein. For example, the methods may also be used in combination with other systems and methods, and are not limited to practice with only the systems and methods as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A breather system comprising:
   a platform;
   a diffusion inhibition tube formed through said platform and extending from a first end on a first surface of said platform to a second end on a second surface of said platform, said diffusion inhibition tube comprising a length between said first end and said second end and a diameter wherein a ratio of the length to the diameter is sized to inhibit a diffusion of gas through said diffusion inhibition tube; and
   a membrane covering at least one end of said diffusion inhibition tube and configured to inhibit passage of liquids or particles through said diffusion inhibition tube.

2. The breather system of claim 1, wherein said ratio of the length to the diameter facilitates reduces a diffusion of water vapor through said diffusion inhibition tube.

3. The breather system of claim 1, wherein said cap comprises a tortuous path from an ambient space to said membrane.

4. The breather system of claim 1, wherein said platform comprises an exterior surface of an electro-mechanical actuator.

5. The breather system of claim 1, wherein said platform comprises a groove circumscribing one of said first end and said second end, said groove configured to receive a sealing member.

6. The breather system of claim 1, wherein said platform comprises a groove circumscribing one of said first end and said second end, said groove configured to receive an elastomeric ring sealing member.

7. The breather system of claim 1, wherein said membrane is formed from at least one of a fabric material, a sintered metal material, and a sintered ceramic material.

8. The breather system of claim 1, further comprising a desiccant positioned proximate said platform on a side opposite from said membrane.

9. A method of assembling an actuator system, the actuator system including an actuator device operably positioned within a housing, said method comprising:
providing an opening through a wall of the housing, the opening extending between an interior cavity defined by the housing and an exterior space surrounding the housing; and
covering the opening with a membrane that is impermeable to liquids and particles; and
coupling a cap to the housing, the cap comprising a tortuous path between the exterior space and the membrane to facilitate shielding the membrane from direct impingement by liquids or particles, wherein providing an opening comprises providing a platform including a tubular shaped passage having a length greater than a diameter and sized to reduce a diffusion of gas from the exterior space to the interior cavity and coupling the platform to the housing.

10. The method of claim 9, wherein providing an opening comprises providing a tubular shaped passage having a length greater than a diameter and sized to reduce a diffusion of a gas from the exterior space to the interior cavity.

11. The method of claim 9, further comprising providing a groove circumscribing the opening proximate the exterior space.

12. The method of claim 9, wherein covering the opening with a membrane comprises covering the opening with a membrane that is fabricated from at least one of a fabric material, a sintered metal material, and a sintered ceramic material.

13. An actuator system comprising:
a housing comprising a cavity defined by said housing and an opening defined in a wall of said housing, said housing encasing an actuator within said cavity;
a membrane covering said opening; and
a cap covering said membrane, said cap comprising a tortuous path between said membrane and ambient outside said cap, wherein said opening comprises a diffusion inhibition tube having a length greater than a diameter of the tube so as to inhibit a diffusion of gas through said tube.

14. The actuator system of claim 13, wherein said housing comprises a groove circumscribing the opening.

15. The actuator system of claim 13, wherein said groove is configured to receive a sealing member therein.

16. The actuator system of claim 13, wherein said membrane is fabricated from at least one of a fabric material, a sintered metal material, and a sintered ceramic material.

17. The actuator system of claim 13, further comprising a desiccant cartridge that facilitates increasing an aridity within said cavity.

18. The actuator system of claim 13, wherein said cap is configured to inhibit direct impingement of liquid and particles on said membrane.

* * * * *